United States Patent
Umeda

[19]

[11] Patent Number: 5,249,079
[45] Date of Patent: Sep. 28, 1993

[54] LENS SYSTEM
[75] Inventor: Hiromu Umeda, Sakai, Japan
[73] Assignee: Minolta Camera Kabushiki Kaisha, Osaka, Japan
[21] Appl. No.: 573,874
[22] Filed: Aug. 28, 1990
[30] Foreign Application Priority Data
 Aug. 28, 1989 [JP] Japan .................. 1-221299
[51] Int. Cl.⁵ .................. G02B 27/64; G02B 15/14
[52] U.S. Cl. .................. 359/554; 359/557; 359/686
[58] Field of Search .................. 350/500-501, 350/423, 427, 432; 359/554-557, 683-693, 642, 676, 739, 740

[56] References Cited
U.S. PATENT DOCUMENTS

| | | | |
|---|---|---|---|
| 3,884,548 | 5/1975 | Linder | 359/555 |
| 3,953,106 | 4/1976 | Furukawa et al. | 359/557 |
| 4,907,868 | 3/1990 | Kitagishi et al. | 350/500 |
| 4,974,951 | 12/1990 | Sander et al. | 359/874 |
| 4,998,809 | 3/1991 | Tsuji et al. | 359/557 |
| 5,000,549 | 3/1991 | Yamazaki | 350/500 |
| 5,000,551 | 3/1991 | Shibayama | 350/427 |
| 5,018,845 | 5/1991 | Yamazaki | 350/500 |
| 5,039,211 | 8/1991 | Haruyama | 359/557 |

FOREIGN PATENT DOCUMENTS

| | | | |
|---|---|---|---|
| 21133 | 5/1981 | Japan | 359/557 |
| 57-7414 | 2/1982 | Japan | . |
| 40804 | 9/1987 | Japan | 359/557 |
| 201623 | 8/1988 | Japan | . |
| 201624 | 8/1988 | Japan | . |
| 116619 | 5/1989 | Japan | . |
| 189621 | 7/1989 | Japan | . |
| 191112 | 8/1989 | Japan | . |

Primary Examiner—Bruce Y. Arnold
Assistant Examiner—Thong Nguyen
Attorney, Agent, or Firm—Price, Gess & Ubell

[57] ABSTRACT

A lens system comprises a plurality of lens elements, including a deflecting lens group, to stabilize a blurred image at a focal plane. The deflecting lens group moves slightly in a circular orbit around a predetermined central point on an optical axis of the lens system, resulting in the deflecting lens group being decentered in a direction perpendicular to the optical axis of the lens system and at the same time an optical axis of the deflecting lens group being inclined relative to the optical axis of the lens system.

5 Claims, 2 Drawing Sheets

LENS SYSTEM

BACKGROUND OF THE INVENTION

1. Field of the Invention

The present invention relates to a lens system, particularly to such system having a function to stabilize a blurred image when a camera is handheld during low shutter speeds and used in low light levels.

2. Description of the Related Art

In conventional photography, the quality of photographs was often deteriorated mainly because of out of focus and camera-shake.

Recently, an auto-focus mechanism has been employed in a camera. In addition, the auto-focus mechanism performs to a high degree of accuracy. Therefore, the problem caused by out of focus has been almost solved.

On the other hand, the problem caused by camera-shake has not been solved.

One reason is that the magnification or the telephoto ratio of a lens system is becoming higher and higher, resulting that an influence of camera-shake on an image becomes great.

In addition, a camera equipped with a zoom lens system has taken the place of a camera equipped with a single focal length lens system, resulting in the size and weight of a camera becoming large and heavy. It is difficult for a user to support such a large and heavy camera, which causes camera-shake.

Relating to camera-shake, various deflecting lens systems to stabilize a blurred image by moving a particular lens portion of the image forming lens system in a perpendicular direction relative to an optical axis have been suggested in Japanese laid open Pat. Nos. 63-115126, 63-133119, 63-229425, 63-201622, 63-169614, 50-137555, 63-201624 and 1-116619, and U.S. Pat. No. 4,907,868.

In addition, a mechanism for moving the deflecting lens portion, which comprises, for example, an acceleration sensor and an actuator, is shown in Japanese laid open Pat. No. 62-47011.

However, these related arts disclose only deflecting lens systems to stabilize a blurred image in a single focal length lens system.

In using a deflecting lens group stabilizing the blurred image in the zoom lens system, aberrations (asymmetry of curvature of field and paraxial coma aberration) based on decentering of the deflecting lens group must be decreased over the zooming range. However, even if the deflecting lens system described in the related art is employed in the zoom lens system, it is very difficult to effectively reduce the aberration over the zooming range.

On the other hand, if a deflecting lens group to stabilize the blurred image is employed in a zoom lens system, it is desirable to correct aberration caused in the deflecting lens group by the deflecting lens group itself. This means that the number of the lens elements composing the deflecting lens group will be increased, resulting in that the entire size of the zoom lens system and a mechanism for moving the deflecting lens group will be enlarged.

SUMMARY OF THE INVENTION

An object of the present invention is to provide a lens system which comprises a small number of lens elements with little aberration irrespective of employment of a deflecting lens system for stabilizing a blurred image.

An another object of the present invention is to provide a zoom lens system which comprises a small number of lens elements with only a little aberration over the zooming range irrespective of employment of a deflecting lens group for stabilizing a blurred image.

The features of the present invention which are believed to be novel are set forth with particularity in the appended claims. The present invention, together with further objects and advantages thereof, may best be understood by reference to the following description taken in conjunction with the accompanying drawings.

DETAILED DESCRIPTION OF PREFERRED EMBODIMENTS

Figure 1:
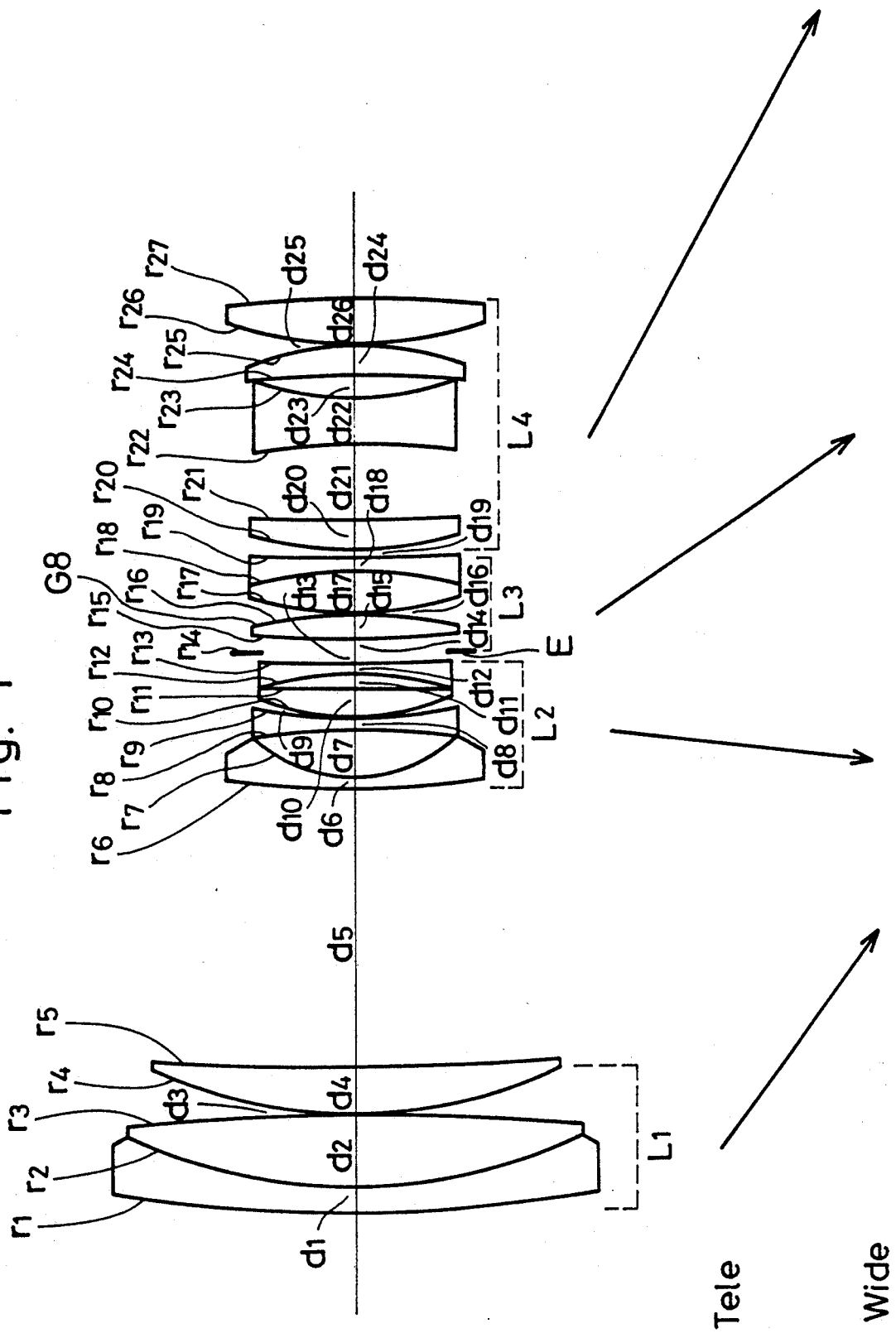
FIG. 1 shows a cross sectional view of a lens system according to an embodiment of the present invention.

FIG. 1 shows an arrangement of one embodiment constructed according to the invention. A zoom lens system shown in FIG. 1 comprises, from an object-side to an image-side, a first lens unit $L_1$ having a positive refracting power, a second lens unit $L_2$ having a negative refracting power, a third lens unit $L_3$ having a positive refracting power, and the fourth lens unit $L_4$ having a positive refracting power. A diaphragm E is disposed in the third lens unit $L_3$.

At least one lens element of the third lens unit disposed at the image-side relative to the diaphragm E is designed as a deflecting lens group to stabilize a blurred image caused by camera-shake. The deflecting lens group moves slightly in a circular orbit round a predetermined central point on an optical axis of the lens system.

The zoom lens system fulfills the following condition:

$$0.2 < |\chi/f_T| < 3.5 \qquad (1)$$

$$6 < |f_A/F_N| < 32 \qquad (2)$$

wherein $\chi$ represents a distance between an apex of an object-side surface of the deflecting lens group and the central point for a movement of the deflecting lens group, $f_T$ represents a focal length of the zoom lens system at a longest focal length condition, $f_A$ represents a focal length of the deflecting lens group, and $F_N$ represents a f-number at the longest focal length condition.

If the blurred image is stabilized by moving the image deflecting lens group in a perpendicular direction relative to an optical axis of the lens system (hereinafter, referred to as "parallel decentering") as proposed in the prior arts, aberration inevitably increases.

On the other hand, according to the embodiment of the present invention, the blurred image is stabilized both by slanting the optical axis of the deflecting lens group relative to the optical axis of the lens system (hereinafter, referred to as "slant decentering") and by "parallel decentering". In this way, aberration is kept well balanced.

Performing "parallel decentering" and "slant decentering" at the same time, as proposed in the present invention, is approximately equivalent to a slight movement of the deflecting lens group in a circular orbit round a predetermined central point on an optical axis.

The condition (1) is for defining a balance of a "slant decentering" amount relative to a "parallel decentering" amount of the deflecting lens group. If the distance $\chi$ is too long or too short, an appropriate "slant decentering" amount can not be obtained, and therefore the aberration due to the "parallel decentering" can not be adequately corrected.

In other words, the condition (1) is directed to a standardization of the distance $\chi$ by the longest focal length of the entire zoom lens system. Accordingly, if the upper limit of the condition (1) is exceeded, the aberration due to the "parallel decentering" is not adequately corrected. On the contrary, if the lower limit is exceeded, the correction of the aberration is excessively performed.

On the other hand, if the f-number $F_N$ becomes larger, the permissible range for a deteriorating image is enlarged. An image deterioration amount is changed in response to the focal length of the deflecting lens group. The condition (2) sets a desirable range of the f-number $F_N$ at the longest focal length condition with respect to the focal length $f_A$ of the deflecting lens group.

If the lower limit of the condition (2) is exceeded, a shifting amount of the image by performing "parallel and slant decentering" becomes large relative to the decentering amount of the deflecting lens group and therefore the precision of the decentering amount of the deflecting lens group is strictly required. In addition, a large f-number is not suitable for a zoom lens system in view of marketability.

On the contrary, if the upper limit of the condition (2) is exceeded, a shifting amount of the image by performing "parallel and slant decentering" becomes slight relative to the decentering amount of the deflecting lens group and therefore the large decentering amount of the deflecting lens group is required for realizing a predetermined shifting amount of the image. In addition, the f-number becomes small so that the permissible range for the amount of a deteriorating image caused by the deflecting lens group is narrowed.

It is desirable to dispose the deflecting lens group in the third lens unit $L_3$ for the reason to be subsequently described. A deterioration of aberration due to stabilizing the blurred image is required to be small. It is therefore desirable to dispose the deflecting lens group at a position where a height of incidence and an angle of incidence do not change significantly during the zooming operation. Further, if a lens disposed at a place where a principal ray of the off-axial light intersects with an optical axis of the zoom lens system is utilized as the deflecting lens group, a deterioration of aberration due to the decentering of the deflecting lens group becomes small.

For the reason described above, in the present embodiment, at least one lens element disposed at the image-side relative to the diaphragm E in the third lens unit is utilized as the deflecting lens group for stabilizing the blurred image. It is further desired that a lens element, for example, G8 in the present embodiment in the vicinity of the diaphragm E is used as the deflecting lens group.

The present embodiment further satisfies the following condition:

$$0.2 < |f_A/f_T| < 1 \qquad (3)$$

Generally, a shifting amount of an image by performing "parallel and slant decentering" is changed in response to a focal length $f_A$ of the deflecting lens group. In the case where the focal length $f_A$ satisfies the condition (3), the shifting amount of the image relative to the decentering amount of the deflecting lens group is suitable.

If the lower limit of the condition (3) is exceeded, the shifting amount of the image becomes large relative to the decentering amount of the deflecting lens group and therefore the precision of the decentering amount of the deflecting lens group is strictly required.

On the contrary, if the upper limit of the condition (3) is exceeded, the shifting amount of the image becomes slight, and therefore a large decentering amount of the deflecting lens group is required for shifting the image by a predetermined amount. In addition, deterioration of aberration occurs at the shortest focal length condition.

The lens units $L_1-L_4$ of FIG. 1 are designed to shift along with the optical axis from the longest focal length condition Tele to the shortest focal length condition Wide as indicated by respective arrows.

Figure 2:
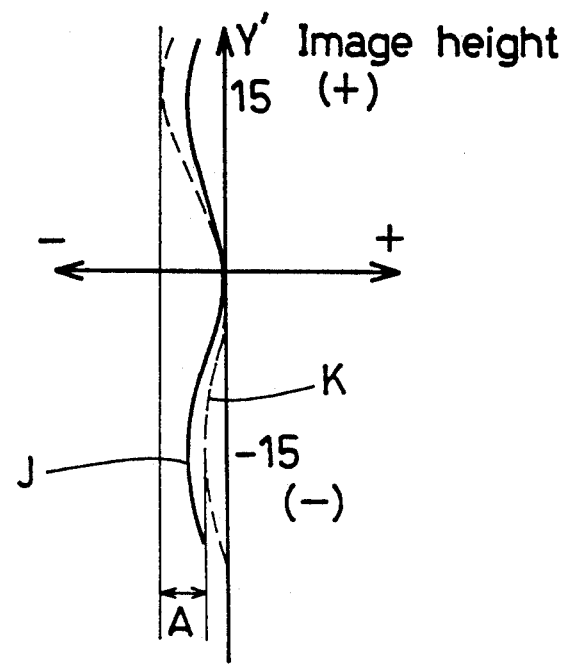
FIG. 2 is a graphic representation of curvature of the field of the embodiment.

Next, the description will be given on an asymmetry of curvature of field and an axial comatic aberration generated when the lens element G8 of the third lens unit $L_3$ in FIG. 1 is eccentrically moved as the deflecting lens group. If the decentering of the lens element G8 is not performed, curvature of field is symmetric between the image heights (+) and (−). This means that an asymmetry of curvature of field is not generated. In FIG. 2, a curved solid line J represents a designed value (that is, in a case of an asymmetry equal to zero). Table 1 shows designed values of curvature of field at respective image heights on a tangential image surface T and a sagittal image surface S. The signs thereon are defined as follows. If the image surface at the image height (+) side exists at minus side, that is, left side in FIG. 2, relative to the designed value (the solid curved line J in FIG. 2), the sign is set to be negative. On the contrary, if the image surface at the image height (+) side exists at plus side relative to the designed value, the sign is set to be positive.

Figure 3:
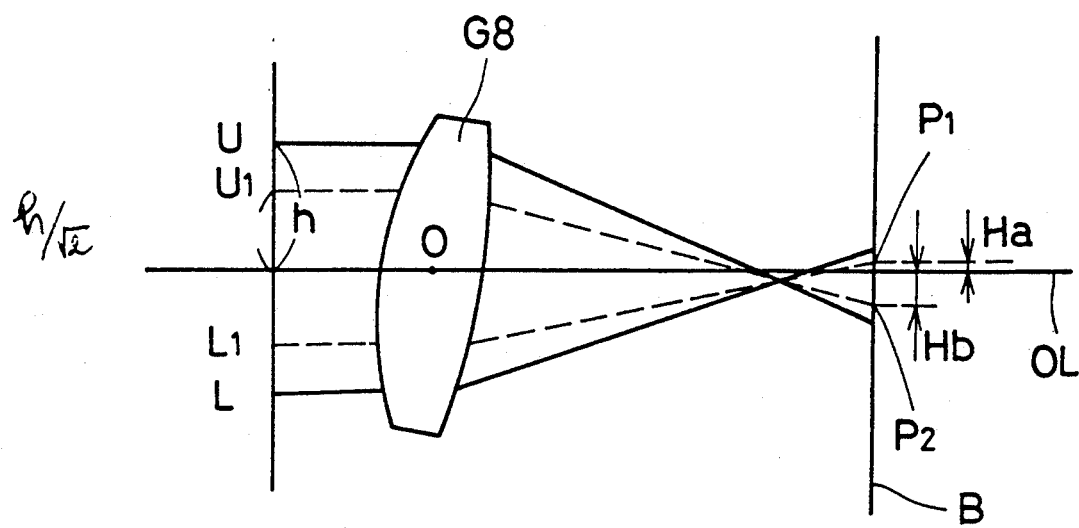
FIG. 3 shows a performance of a deflecting lens group for stabilizing a blurred image, relating to a paraxial coma aberration in the embodiment.

Generally, if the decentering of the lens element G8 is not performed, an axial coma aberration is zero. However, the decentering of the lens element G8 is performed, the axial coma aberration occurs as shown in FIG. 3.

Table 2 shows an asymmetry of curvature of field in cases of using the following four methods for decentering the lens element G8 to obtain 0.27 mm of a shifting amount of the image at the longest focal length condition. Table 3 shows the axial comatic aberrations in the same cases.

method 1: only "parallel decentering" ("parallel decentering" amount is 0.2).

method 2: "parallel decentering" and appropriate "slant decentering" ($\chi=140$), resulting in the aberrations well corrected.

method 3: "parallel decentering" and slight "slant decentering" ($\chi=480$), resulting in a shortage of correcting aberration.

method 4: "parallel decentering" and large "slant decentering" ($\chi=24$), resulting in an excess of correcting aberration.

The asymmetry of curvature of field is represented by difference A between the values at the image heights $Y'=\pm 15$ on the dotted line K by which an image surface is represented when the decentering of the lens element G8 is performed. On the other hand, as shown in FIG. 3, upper and lower points having the height of incidence $h(h=\pm 15)$ are referred respectively as U and L, and upper and lower points having the height $h/\sqrt{2}$ are defined respectively as $U_1$ and $L_1$. Each light passing through the points $U_1$ and $L_1$ reach the points $P_1$ and $P_2$ on an image surface B. The distances from the points $P_1$ and $P_2$ to an optical axis OL are referred to as $H_a$ and $H_b$. The axial comatic aberration can be represented by $(H_a+H_b)/2$.

As mentioned above, a desired condition is that a deterioration of aberration is not found, in other words, the asymmetry of curvature of field is not generated even if the decentering of the deflecting lens group is performed. This means, in Table 2, the absolute values of asymmetry of curvature of field are required to be close to zero. Comparing the absolute values between the methods 1 and 2 in Table 2, and the absolute values in Table 1 at image height 15 mm, the absolute values of the method 2 as for the tangential image is quite smaller than those of the method 1 in Table 2 and also those of Table 1 as for the sagittal image, the absolute values of the method 2 are larger than those of the method 1, however, not so much larger than those of Table 1.

On the other hand, the absolute value Tele-T of the method 1 is too large compared with that of Table 1. This means only performing "parallel decentering" is not enough to correct the deterioration of aberration.

With the same reason, the method 3 and 4 are not suitable for improving the aberrations.

Data will be described with respect to the embodiment. In a table 4, f represents a focal length of the lens system, $F_{NO}$ represents an f-number, $r_1$, $r_2$, $r_3$, ... are radii of curvature with respective sub-number indicating the surfaces counted from the object-side to the image-side along the optical axis, $d_1$, $d_2$, $d_3$, ... represent the axial distances and include both air spaces and actual thickness of lens elements along the optical axis, $N_1$, $N_2$, $N_3$, ... represent the refractive indices of respective lens elements and again, the sub-number refers to the particular optical element counted from the object-side to the image-side, and $\nu_1$, $\nu_2$, $\nu_3$, ... represent Abbe numbers of respective lens elements substantially counted from the object-side.

TABLE 1

| Image height (mm) | T at Tele | S at Tele | T at Wide | S at Wide |
|---|---|---|---|---|
| 4 | −0.022 | −0.021 | −0.039 | −0.027 |
| 8 | −0.083 | −0.081 | −0.124 | −0.091 |
| 12 | −0.093 | −0.134 | −0.283 | −0.180 |
| 15 | −0.077 | −0.151 | −0.462 | −0.244 |
| 18 | −0.084 | −0.137 | −0.528 | −0.232 |

TABLE 2

| | Asymmetry of curvature of field | | | |
|---|---|---|---|---|
| | T at Tele | S at Tele | T at Wide | S at Wide |
| Method 1 | 0.285 | −0.084 | 0.235 | −0.0473 |
| Method 2 | −0.074 | −0.168 | −0.0194 | −0.10 |
| Method 3 | 0.178 | −0.110 | 0.159 | −0.063 |
| Method 4 | −2.00 | −0.589 | −1.281 | −0.363 |

TABLE 3

| | Axial comatic aberration | |
|---|---|---|
| | Tele | Wide |
| Method 1 | 0.0121 | 0.0076 |
| Method 2 | 0.0022 | 0.0024 |
| Method 3 | 0.0091 | 0.0061 |
| Method 4 | −0.046 | −0.047 |

TABLE 4

| f = 35.9~131.5 | | $F_{NO}$ 3.608–4.56 | |
|---|---|---|---|
| Radius of Curvature | Distance | Refractive Index | Abbe Number |
| $r_1$ 155.12197 | | | |
| | $d_1$ 2.20000 | $N_1$ 1.80518 | $\nu_1$ 25.43 |
| $r_2$ 51.21901 | | | |
| | $d_2$ 7.10000 | $N_2$ 1.51680 | $\nu_2$ 64.2 |
| $r_3$ −287.11129 | | | |
| | $d_3$ 0.15000 | | |
| $r_4$ 50.29700 | | | |
| | $d_4$ 4.50000 | $N_3$ 1.77250 | $\nu_3$ 49.77 |
| $r_5$ 309.92376 | | | |
| | $d_5$ 0.823~27.032 | | |
| $r_6$ 100.68405 | | | |
| | $d_6$ 1.30000 | $N_4$ 1.75450 | $\nu_4$ 51.57 |
| $r_7$ 15.88500 | | | |
| | $d_7$ 4.15000 | | |
| $r_8$ −96.11900 | | | |
| | $d_8$ 1.20000 | $N_5$ 1.69680 | $\nu_5$ 56.47 |
| $r_9$ 44.32400 | | | |
| | $d_9$ 0.15000 | | |
| $r_{10}$ 24.65600 | | | |
| | $d_{10}$ 2.70000 | $N_6$ 1.84666 | $\nu_6$ 23.8 |
| $r_{11}$ 347.43575 | | | |
| | $d_{11}$ 1.60000 | | |
| $r_{12}$ −30.04900 | | | |
| | $d_{12}$ 1.10000 | $N_7$ 1.61800 | $\nu_7$ 63.39 |
| $r_{13}$ 289.43560 | | | |
| | $d_{13}$ 18.996~1.1 | | |
| $r_{14}$ ∞ (diaphragm) | | | |
| | $d_{14}$ 1.24000 | | |
| $r_{15}$ 88.90098 | | | |
| | $d_{15}$ 2.40000 | $N_8$ 1.51680 | $\nu_8$ 64.2 |
| $r_{16}$ −52.11400 | | | |
| | $d_{16}$ 0.15000 | | |
| $r_{17}$ 35.73900 | | | |
| | $d_{17}$ 4.20000 | $N_9$ 1.54072 | $\nu_9$ 47.2 |
| $r_{18}$ −35.73900 | | | |
| | $d_{18}$ 1.20000 | $N_{10}$ 1.75520 | $\nu_{10}$ 27.51 |
| $r_{19}$ 214.30806 | | | |
| | $d_{19}$ 9.041~0.728 | | |
| $r_{20}$ 33.16100 | | | |
| | $d_{20}$ 3.18000 | $N_{11}$ 1.60342 | $\nu_{11}$ 38.0 |
| $r_{21}$ 240.26910 | | | |
| | $d_{21}$ 7.47000 | | |
| $r_{22}$ −85.75998 | | | |
| | $d_{22}$ 4.55000 | $N_{12}$ 1.80741 | $\nu_{12}$ 31.59 |
| $r_{23}$ 30.60800 | | | |
| | $d_{23}$ 1.94000 | | |
| $r_{24}$ −196.06305 | | | |
| | $d_{24}$ 3.00000 | $N_{13}$ 1.51680 | $\nu_{13}$ 64.2 |
| $r_{25}$ −29.78300 | | | |
| | $d_{25}$ 0.20000 | | |
| $r_{26}$ 38.45200 | | | |
| | $d_{26}$ 4.20000 | $N_{14}$ 1.51742 | $\nu_{14}$ 52.2 |
| $r_{27}$ −166.69500 | | | |

In the above-mentioned embodiment, a zoom lens system is disclosed. However, the moving method of the deflecting lens group is also applicable to a single focal length lens system. In this case, the lens system is required to comprise, from an object-side to an image-side, a first lens unit having a positive refracting power, a second lens unit having a negative refracting power, a third lens unit having a positive refracting power, a fourth lens unit having a positive refracting power, and a diaphragm E disposed in the third unit.

At least one lens element of the third lens unit disposed at the image-side relative to the diaphragm E is designed as a deflecting lens group to stabilize a blurred image caused by camera-shake. The deflecting lens group moves slightly in a circular orbit round a predetermined central point on an optical axis of the lens system.

The lens system fulfills the following condition:

$$0.2 < |\chi/f| < 3.5 \quad (4)$$

wherein $\chi$ represents a distance between an apex of an object-side surface of the deflecting lens group and the central point for a movement of the deflecting lens group, f represents a focal length of the lens system.

The condition (4) is for defining a balance of a "slant decentering" amount relative to a "parallel decentering" amount of the deflecting lens group. If the distance $\chi$ is too long or too short, an appropriate "slant decentering" amount can not be obtained, and therefore the aberration due to the "parallel decentering" can not be adequately corrected.

In other words, the condition (4) is directed to a standardization of the distance $\chi$ by the focal length of the entire lens system. Accordingly, the upper limit of the condition (4) is exceeded, the aberration due to the "parallel decentering" is not adequately corrected. On the contrary, the lower limit is exceeded, the correction of the aberration is excessively performed.

The lens system further can fulfill the following condition;

$$6 < |f_A/F_N| < 32 \quad (5)$$

wherein $f_A$ represents a focal length of the deflecting lens group, and $F_N$ represents the minimum F number of the zoom lens system at a longest focal length condition.

$$0.2 < |\chi/f_T| < 3.5 \quad (6)$$

$$6 < |f_A/F_N| < 32 \quad (7)$$

wherein $\chi$ represents a distance between an apex of an object-side surface of the deflecting lens group and the central point for a movement of the deflecting lens group, and $f_T$ represents a focal length of the zoom lens system at a longest focal length condition.

$f_A$ represents a focal length of the deflecting lens group, and $F_N$ represents the minimum F number of the zoom lens system at a longest focal length condition.

What is claimed is:

1. A zoom lens system which comprises a plurality of lens elements comprising a first lens unit having a positive refractive power, a second lens unit having a negative refractive power, a third lens unit having a positive refractive power, and a fourth lens unit having a positive refractive power, said zoom lens system performing a zooming operation by shifting at least one lens unit so that a distance between the shifted lens unit and an adjacent lens unit varies, and said zoom lens comprising a deflecting lens group to stabilize a blurred image at a focal plane, said deflecting lens group moving slightly in a circular orbit around a predetermined point on an optical axis of the lens system, resulting in said deflecting lens group being decentered with respect to the optical axis of the lens system and, at the same time, an optical axis of said deflecting lens group is inclined relative to the optical axis of the lens system, and the following condition is fulfilled:

$$0.4 < |fA/fT| < 1$$

wherein fA represents a focal length of the deflecting lens group, and fT represents a focal length of the zoom lens system at a longest focal length condition.

2. A zoom lens system according to claim 1 which fulfills the following condition:

$$0.2 < |\chi/f_T| < 3.5$$

$$6 < |f_A/F_N| < 32$$

wherein $\chi$ represents a distance between an apex of an object-side surface of the deflecting lens group and the predetermined point for a movement of the deflecting lens group, and $f_T$ represents a focal length of the zoom lens system at a longest focal length condition.

$f_A$ represents a focal length of the deflecting lens group, and $F_N$ represents the F number of the zoom lens system at a longest focal length condition.

3. A zoom lens system according to claim 1 further comprising a diaphragm in at least one lens unit, wherein the deflecting lens group is disposed at the image-side relative to the diaphragm.

4. A zoom lens system according to claim 3, wherein both the diaphragm and the deflecting lens group are included in a third lens unit.

5. A zoom lens system comprising, from an object-side to an image-side, a first lens unit having a positive refracting power, a second lens unit having a negative refracting power, a third lens unit having a positive refracting power which includes a diaphragm and a fourth lens unit having a positive refracting power, in response to the zooming operation performed from a shortest focal length condition to a longest focal length condition, a distance between a first lens unit and a second lens unit is decreased and a distance between a second lens unit and a third lens unit is increased, and at least one lens element disposed at the image-side relative to the diaphragm composing a deflecting lens group, to stabilize a blurred image at a focal plane, said deflecting lens group moving slightly in a circular orbit round a predetermined point on an optical axis of the lens system, and the following condition is fulfilled:

$$0.2 < |\chi/f_T| < 3.5$$

wherein $\chi$ represents a distance between an apex of an object-side surface of the deflecting lens group and the point for a movement of the deflecting lens group, and $f_T$ represents a focal length of the zoom lens system at a longest focal length condition.

* * * * *